May 12, 1942.  A. E. KROGH  2,283,007

FURNACE CONTROL

Filed Oct. 7, 1937

INVENTOR,
ANKER E. KROGH,
By George M. ~~~~~~~
atty.

Patented May 12, 1942

2,283,007

UNITED STATES PATENT OFFICE 2,283,007

FURNACE CONTROL

Anker E. Krogh, Philadelphia, Pa., assignor to The Brown Instrument Company, Philadelphia, Pa., a corporation of Pennsylvania Application October 7, 1937, Serial No. 167,717

15 Claims. (Cl. 236—15)

The general object of the present invention is to provide an improved system for controlling temperature conditions in heat treating furnaces, such as annealing furnaces of the intermittent type, in which it is desirable to make the heating of the furnace dependent both upon the temperature of the work and the temperature of the furnace, to the end that the work may be rapidly brought up to, and thereafter maintained at a predetermined soaking temperature, without unnecessary waste of time in completing the heat treating operation, while at the same time avoiding the risk of injuriously overheating the work or furnace.

The present invention is particularly adapted for, though not limited to, use in controlling the work and furnace temperatures in a heat treating furnace of the bell, or removable dome, type, and is characterized in particular, by the comparative simplicity of the control apparatus required for regulation of the furnace heating effect in joint response to separately measured work and furnace temperatures.

A specific object of the present invention is to provide simple and effective means by which the furnace heat supply is controlled by the furnace temperature, while the work and furnace are being heated up to their final or soaking temperatures, is controlled for a time, at least, by the work temperature, and as temperature conditions change may be controlled jointly by the work and furnace temperatures, and by the furnace temperature alone, if that temperature becomes objectionably high.

In the preferred practical form of the present invention, I make use of separate temperature measuring and control instruments for measuring and controlling work and furnace temperatures, and provide means to control the furnace heat supply, by one, or by the other, or jointly by both of the two measuring instruments, according to the values of the controlling temperatures measured.

A further specific object of the present invention is to provide a so-called "proportioning" control system, including a "proportioning" relay motor actuated by unbalance in the bridge circuit of the "proportioning" system, to adjust the furnace heat supply, and to rebalance the bridge and thereby interrupt its operation, and the invention is characterized in particular by the manner in which the bridge circuit is subject to unbalancing effects by one measuring instrument, and by the other measuring instrument, and by both instruments collectively, under different conditions prevailing at different times.

The various features of novelty which characterize the present invention are pointed out with particularity in the claims annexed to, and forming a part of this specification. For a better understanding of the invention, however, its advantages and specific objects attained with its use, reference should be had to the accompanying drawing and descriptive matter in which I have diagrammatically illustrated and described a preferred embodiment of the invention.

In the embodiment of the invention diagrammatically illustrated by way of example, A represents the bell or dome of a furnace of well-known type, comprising a hearth or furnace base B, upon which the bell A is seated during the heating operation, and from which it is removed for the removal of the treated work and the introduction of work to be treated. The bell A as ordinarily constructed comprises a metal shell and a refractory lining A'. Ordinarily, and as shown, the roof of the bell A carries a bail or eye A², for engagement by the hook of a crane (not shown) employed to lift the bell off, and replace it on the base B. The work C in the furnace to be annealed or otherwise heat treated, as conventionally illustrated, consists of a pile of metal plates stacked upon the base B. As shown the work C is enclosed by an inner bell, hood, or work cover D of metal, smaller than, and spaced away from the side and roof walls of the bell A. The hood D' rests on the base B. Sealing means D are provided to prevent gas leakage between the space enclosed by the hood D, and the space between the bell A and hood D.

Figure 1:
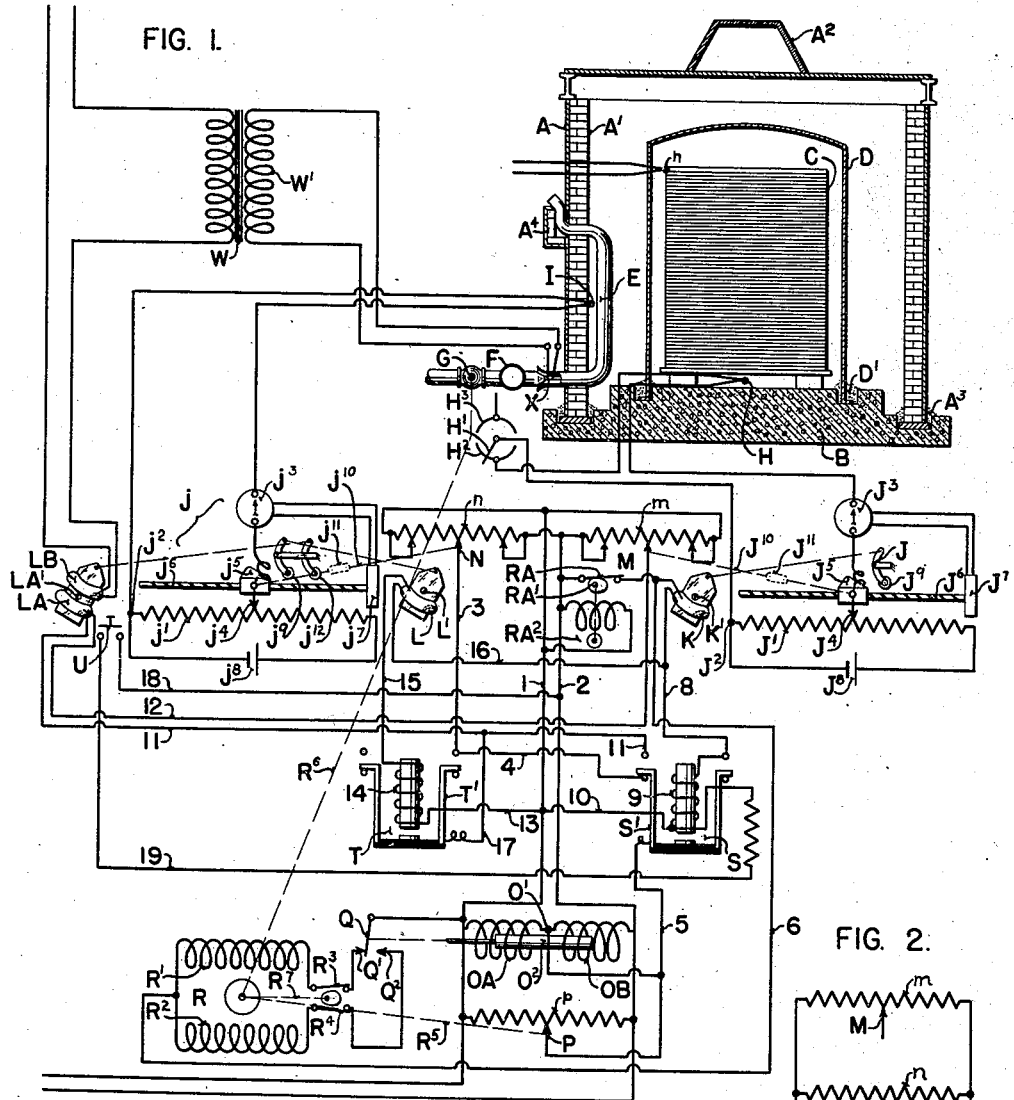
Fig. 1 is the diagrammatic representation of a bell type furnace, and means, including a special "proportioning" system circuit arrangement, for controlling the heat supply to the furnace.

The furnace conventionally illustrated in Fig. 1 is of the well-known, so-called "radiant tube" type, in which the furnace is heated by radiation from a plurality of metal tubes E, each comprising a vertical portion at the inner side of, and adjacent the vertical wall of the hood A, and having upper and lower end portions extending horizontally through said wall. Each of the tubes E serves as a combustion chamber receiving a combustible mixture of fuel gas and air at its lower end from a supply manifold F, at a rate regulated, as diagrammatically illustrated, by the adjustment of a supply valve G. Each tube discharges products of combustion at its upper end. As shown sealing means $A^3$ are provided for sealing the joint between the lower edge of the hood A and the base B, and other sealing means $A^4$, are provided to prevent leakage through the openings in the vertical wall of the bell A through which the upper horizontal portions of the tubes E extend, those openings being larger in cross section than the tubes to accommodate the relative expansion of the tubes E and bell A.

A thermocouple H is subject to the controlling work temperature at the bottom of the work C, and a thermocouple I is responsive to the controlling furnace temperature. As shown the thermocouple I has its hot junction closely adjacent the outer side of one of the heating tubes E. Thermocouple H has its terminals connected to the measuring terminals of a temperature measuring and control instrument J, which advantageously, and as shown, is a self-balancing potentiometer instrument, and may well be of the commercial potentiometer type known as the "Brown potentiometer," the general characteristics of which are disclosed in the Harrison Patent No. 1,946,280, granted February 6, 1934. As shown one terminal of the thermocouple H is connected to one terminal $J^2$ of the potentiometer slide wire resistor $J'$. A second terminal of thermocouple H is connected to one terminal of the instrument galvanometer $J^3$. The second terminal of the latter is connected to a contact $J^4$ in engagement with and adjustable along the length of the slide wire resistor $J'$. As diagrammatically illustrated, the contact $J^4$ is carried by the instrument pen carriage $J^5$, and the latter is adjusted along the length of the resistor $J'$, by the rotation of a helically grooved shaft $J^6$ in threaded engagement with the carriage $J^5$. The shaft $J^6$ is rotated, as required to rebalance the potentiometer, by a rebalancing power actuated relay mechanism $J^7$, operating in selective response to the deflection of the pointer of the galvanometer $J^3$. A suitable current flow through the resistor $J'$ is maintained by a suitable source of current $J^8$.

In the balanced condition of the measuring instrument J, as diagrammatically illustrated, the potential drop through the portion of the resistor $J'$ between its terminal $J^2$ and the contact $J^4$ is equal in magnitude, but opposite in direction to the voltage of the thermocouple H. When the temperature of the thermocouple H increases and makes its voltage greater than the potential drop between the terminal $J^2$ and the contact $J^4$, the galvanometer $J^3$ will cause the relay mechanism $J^7$ to rotate the shaft $J^6$ as required to rebalance the instrument by adjusting the carriage $J^5$ and the contact $J^4$ to the right until the potential drop between $J^2$ and $J^4$ equals said voltage. Conversely, on a decrease in the temperature of the thermocouple H, the carriage $J^5$ and contact $J^4$ are adjusted correspondingly to the left.

It is contemplated that in ordinary practice, the instrument J will be a recording instrument, and, as shown, the instrument J is adapted to alternately measure the temperature of the thermocouple H at the bottom of the work, and the temperature of a thermocouple $h$ in contact with the top of the work, though its control action is dependent solely upon its measurements of the temperature of the thermocouple H. For the alternate measurements of the two thermocouple temperatures, use is made of a so-called selector switch. The latter, as diagrammatically shown, comprises a switch arm $H'$ carried by a constantly rotating shaft and successively engaging two arc shaped contacts $H^2$ and $H^3$ during each rotation. The arm $H'$, as shown, is connected to the terminal $J^2$ of the instrument J. The contact $H^2$ is connected to one terminal of the thermocouple H. The contact $H^3$ is connected to one terminal of the thermocouple $h$. The second terminal of each of the thermocouples H and $h$ is permanently connected to the instrument contact $J^4$ through the galvanometer $J^3$.

The furnace or heater temperature thermocouple I has its terminals connected to the measuring terminals of a measuring and control instrument $j$, which may well be, and as shown is, exactly like the instrument J, comprising parts $j'$—$j^8$ corresponding, respectively, to the above mentioned parts $J'$—$J^8$.

The instrument J effects its control actions by its adjustments of a switch actuating lever $J^9$, and resultant adjustments of a switch K, and by its adjustments of a contact M. The instrument $j$ effects its control actions by adjustments of switch actuating levers $j^9$ and $j^{12}$, and resultant adjustments of switches L and LA, respectively, and by adjustments of a contact N.

The lever $J^9$ of the instrument J is positioned along the path of movement of the pen carriage $J^5$, so as to be engaged and turned out of its position shown in the drawing, when the thermocouple H heats up to a predetermined temperature. The lever $J^9$ is link connected to a mercury switch K pivoted to turn about an axis $K'$. The switch K and lever $J^9$ are subjected to a gravitational or other bias force action tending to maintain them in the positions shown, in which the switch K is open. The contact M is diagrammatically shown as connected to the pen carriage $J^5$ of the instrument J by a link $J^{10}$. The latter includes a turn buckle $J''$ for adjusting the effective length of the link. Through the latter, the movement of the carriage $J^5$ gives corresponding movements to the contact M along a slide wire resistor $m$ engaged by the contact. The resistor $m$, as shown, is a so-called instrument, or measuring, resistor, included in the bridge circuit of a "proportioning" control system.

On the attainment of a predetermined temperature of furnace thermocouple I, fixed by the position of the lever $j^9$ along the path of the pen carriage $j^5$ of the instrument $j$, the carriage $j^5$ engages and tilts the lever $j^9$. The tilting of the lever $j^9$ tilts a mercury switch L about its axis $L'$ from the open position shown, in which a suitable bias force tends to maintain it, into a closed position. On the attainment of a somewhat higher temperature by the furnace thermocouple I, the pen carriage $j^5$ engages the lever $j^{12}$ and tilts the switch LA about its axis $LA'$ from the closed position shown in which a suitable bias force tends to maintain that switch, into its open position. The pen carriage $j^5$ adjusts the contact N through a link $j^{10}$ including a turn buckle $j^{11}$, as the instrument J adjusts the contact M through the link $J^{10}$. The contact N engages and is adjustable along a second instrument, or measuring, resistor $n$, included in the above mentioned control circuit.

The above mentioned bridge circuit comprises current supply conductors 1 and 2, between which the instrument resistors $m$ and $n$ are connected in parallel with one another and with two other circuit branches. One of the latter comprises two similar solenoid coils OA and OB, connected in series with one another, and the second is in the form of a control resistor $p$, engaged by an adjustable contact P.

Figure 3:
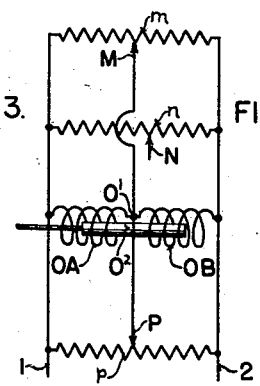
Fig. 3 is another simplified diagram showing the bridge circuit of Fig. 1, in the condition for effecting control in sole response to the work temperature.
Figure 2:
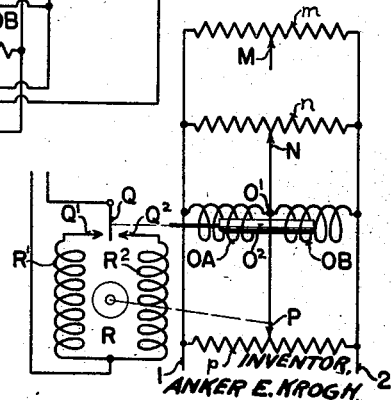
Fig. 2 is a simplified diagram showing the "proportioning" or bridge circuit of Fig. 1 in the condition of the latter, in which the control is solely responsive to furnace temperature.

In the contemplated operation of the apparatus, under the conditions in which the control of the furnace is solely dependent on the temperature of the furnace thermocouple I, the contact N is, and the contact M is not, connected to the contact P and to the common junction point O of the coils OA and OB, as shown in the simplified diagram of Fig. 2. Under the condition in which the furnace control is solely responsive to the work temperature, the contact M is, and the contact N is not, connected to the contact P and the junction point O', as illustrated in the simplified diagram of Fig. 3. Under the condition in which the control is dependent on the temperatures of both thermocouples H and I, the contacts M and N are both connected to the contact P and to the junction point O', as shown in the simplified diagram of Fig. 4. As hereinafter explained, the control circuit is adjusted into its different operative conditions, shown in Figs. 2, 3, and 4, by the adjustment of the switch actuating levers $J^9$ and $j^9$ and $j^{12}$.

As previously stated, in an initial portion of each heat treating operation, during which the work and furnace are being heated up, the control of the heat supply is solely in response to the furnace temperature, so that the control circuit is then in the condition illustrated in Fig. 2. The contact N is then connected to the contact P and junction point O' by circuit elements which, as shown in Fig. 1, comprise conductors 3 and 4, the contact S' of an electromagnetic relay S, then deenergized, and a conductor 5. With that control circuit connection, an increase in the temperature of the furnace thermocouple I, and the corresponding adjustment to the right of the carriage $j^5$ and contact N, unbalances the bridge circuit, if previously balanced as would normally then be the case. That unbalancing action increases the current flow in the solenoid coil OA relative to the current flow through the coil OB, and thereby adjusts the solenoid armature $O^2$ to the left as seen in the drawing.

The armature $O^2$ is link connected to a switch arm Q. When the armature $O^2$ is shifted to the left, the switch arm Q is turned from its normal neutral position into engagement with a switch contact Q'. The switch arm Q is connected to the supply conductor 1, and the contact Q' is connected to one terminal of one energizing winding R' of a reversible relay motor R through a limit switch $R^3$ when the latter is closed. The second terminal of the winding R' is connected to the supply conductor 2 through a conductor 6 and switch RA when the latter is closed. When the bridge circuit is unbalanced in the opposite direction, shifting the armature $O^2$ to the right, the switch arm Q is moved into engagement with a contact $Q^2$. The latter is connected to one terminal of the second energizing winding $R^2$ of the motor R through a limit switch $R^4$, when the latter is closed, and the second terminal of the winding $R^2$ is also connected to the supply conductor 2 through the conductor 6 and switch RA, when the latter is closed.

When the winding R' is energized, the motor R operates through a connection $R^5$ to the contact P, to give the latter a rebalancing adjustment to the left, and operates through its connection $R^6$ with the fuel valve G, to give the latter a closing adjustment. Conversely, when the motor winding $R^2$ is energized, the contact P is given a rebalancing adjustment to the right and the fuel valve G is given an opening adjustment. The limit switches $R^3$ and $R^4$ form part of a limit switch mechanism $R^7$, which may be of any usual or suitable type, and is actuated to open the limit switches $R^3$ and $R^4$ on adjustments of the fuel valve G into its minimum ad maximum flow positions, respectively. The switch RA is opened and closed during the periods in which the instrument J is operatively connected to the thermocouple $h$ and to the thermocouple H, respectively, by means of a cam RA' continuously rotated by a motor $RA^2$ which may also give the selector switch arm H' its rotative movements. The switch RA, permits the instrument J to effect control operations in response to measurements of the temperature of the thermocouple H, while preventing it from effecting control actions in response to measurements of the temperature of the thermocouple $h$.

During the initial heating up operation, the instrument $j$, adjusts the fuel valve G through the motor R, as required to prevent the thermocouple I from attaining a temperature significantly above a predetermined temperature, which, for example, may well be 1700° F. in some cases. The initial heating up operation control by the instrument $j$, is ordinarily terminated when the work thermocouple H reaches its control point temperature, of 1350° F. for example, whereupon the switch K is tilted from its previously open position into its closed position, by the action of the pen carriage $J^5$ on the lever $J^9$. The closure of the switch K energizes the relay S by closing a circuit between the conductors 1 and 2 comprising the switch RA, a conductor 7, the switch K, a conductor 8, the relay winding 9, and a conductor 10.

The described energization of the relay winding 9 moves the relay switch arm S' to disconnect the conductor 5 from the conductor 4 and contact N, and to connect the conductor 5 to a conductor 11. The latter is connected to one terminal of the then closed switch LA. The second terminal of that switch is connected by a conductor 12 to the contact M. The effect of the energization of the relay S, is thus to disconnect the contact N from the contact P and the junction point O, and to connect each of the latter to the contact M. With contact N disconnected from, and the contact M connected to, the contact P and junction point O', the control circuit is in the operative condition shown by the simplified diagram of Figure 3, in which control of the motor R is in sole response to the temperature of the work thermocouple H.

As the heating operation continues, the motor R and valve G remain under the control of instrument J and thermocouple H, unless and until the temperature of the furnace thermocouple I rises so that the pen carriage $j^5$ engages the lever $j^9$ and tilts the switch L into its closed position. If the furnace temperature which the instrument $j$ tends to maintain during the heating up operation is 1700° F., the lever $j^9$ may well be positioned to tilt the switch L into its closed position, when the temperature of thermocouple I reaches 1705° F. The closure of the switch L brings the control circuit into the operative condition shown in Fig. 4, as a result of the energization of a relay T. The latter has one terminal of its energizing coil 14 connected by a conductor 13 to the supply conductor 1, and has its other terminal connected by a conductor 15 to one contact of the mercury switch L. The second contact of the latter is connected by a conductor 16 to the conductor 8, and hence to the supply conductor 2 when the switches K and RA, are both closed.

The energization of the relay winding 14 moves the relay contact T' into engagement with a switch contact to which the conductors 3 and 4 are both connected. The switch arm T' is connected by a conductor 17 to the previously mentioned conductor 11, then connected to the contact S' of the relay S, and thereby to the conductor 5. The effect of the closure of the switch L is therefore to connect the contact N to the contact P and junction point O' of the control circuit, without interrupting the connection of contact M to contact P and junction O'. With the control circuit thus in the operative condition shown by the simplified diagram of Fig. 4, the motor R operates to give the contact P the rebalancing adjustments required to neutralize the unbalancing effects of adjustments given either or both of the contacts M and N. As will be apparent, in the condition of the circuit shown in Fig. 4, the control is thus dependent jointly on the temperature of the furnace thermocouple I and on the temperature of the work thermocouple H.

Figure 4:
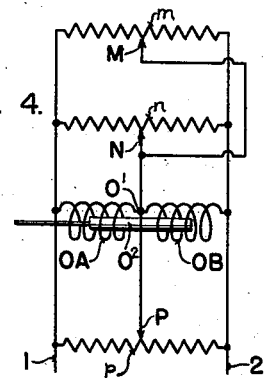
Fig. 4 is another simplified diagrammatic representation of the bridge circuit of Fig. 1 with the latter adjusted for control in joint response to furnace and work temperatures.

Under certain conditions, the joint control attained with the control circuit shown in Fig. 4, will not prevent a further increase of 15° F., or so in the temperature of the thermocouple I, sufficient to cause the pen carriage $j^5$ to engage and tilt the lever $j^{12}$, and thereby adjust the switch LA about its axis LA' from its closed into its open position. The opening of the switch LA, interrupts the connection between the conductors 11 and 12, and thereby disconnects the contact M from the relay contact S' and the conductor 5, but leaves the contact N connected to conductor 5 through conductor 3, relay contact T', conductors 17 and 11, and relay contact S'. The control circuit is thus again put into the operative condition represented by the simplified diagram of Fig. 2. With the control of the motor R and furnace heat supply, thus made subject to the control of the instrument $j$ and with the temperature of the thermocouple I high enough for the pen carriage $j^5$ to engage the lever $j^{12}$, the control circuit will necessarily be unbalanced in such fashion as to displace the armature O' to the left. In consequence, the motor R will then be actuated to effect closing adjustments of the fuel valve G in regular succession until either the throttling effect of the valve is at a maximum, or the furnace temperature falls sufficiently to permit the return of the lever $j^{12}$ to its normal position and the resultant closure of the switch LA. The closure of the switch LA, under the conditions described, returns the control circuit to the operative condition shown in Fig. 4. The shifting of the control from one to the other of the work and furnace thermocouples and the control jointly by both thermocouples as hereinbefore described contributes to the simplicity and effectiveness of the control provisions required to effect a rapid heating up operation without objectionable hunting, or oscillations, of the control temperatures, and with desirable protection against injurious overheating of the work or the furnace. The control in response to the furnace temperature during the initial portion of the heating operation provides direct and immediate protection against overheating the furnace at a time when such overheating may occur and the overheating of the work cannot occur. The subsequent control in direct response to work temperature after the work has been heated up nearly to, but still somewhat below, an injuriously high work temperature, provides direct and immediate protection against overheating the work, while the resultant reduction in the rate of heat supply as the work temperature rises, reduces the risk of an overly high furnace temperature, and the need for heat supply rate reductions solely to reduce the furnace temperature. Control operations in joint response to the heater and work temperatures, contribute to the safe attainment of the desired maximum work temperature, under conditions tending to overly high furnace temperatures. The reduction in the heat supply, regardless of the work temperature, resulting from the attainment of a furnace temperature high enough to cause the pen carriage $j^5$ to tilt the lever $j^{12}$, in conjunction with the other control actions referred to, permit the furnace temperature to be raised, when necessary, nearly to the temperature at which the furnace would be injured, with small risk of the actual attainment of the last mentioned temperature.

Under certain conditions and in starting the heating cycle, it may be desirable to make the heat supply control solely dependent on the temperature of the furnace thermocouple I, regardless of the temperature of the thermocouple H. This result is obtainable with the arrangement shown, by the closure of a manually operable switch U. The closure of switch U, closes a low resistance shunt about the relay winding 9 and the circuit elements 8, K, 7 and RA connecting the winding 9 to the supply conductor 2, said shunt comprising conductors 18, 19 and a small resistance 20. With the switch U closed, the winding 9 is deenergized, and the contact S' is then connected to the conductor 4 whether the switch RA is open or closed.

In the arrangement shown in the drawing, the secondary W' of a transformer W, energizes electrical ignition means X, employed to initiate combustion in the radiant heat elements E. After the furnace is heated up to temperatures of incandescence, the use of the ignition means is unnecessary, since if the flames are then extinguished as a result of a temporary interruption in the fuel supply they will be ignited without auxiliary ignition means when the fuel supply is resumed. It is thus possible to avoid unnecessary expenditure of electric energy by interrupting the operation of the ignition means X, as soon as the furnace is sufficiently heated to maintain combustion. To this end, in accordance with the present invention, the primary of the transformer W includes a switch LB. The latter is mounted on the tilting switch support carrying the previously mentioned switch LA, and like the latter is adjusted from its closed into its open position by the tilting of the switch lever $j^{12}$, on the attainment of the furnace temperature assumed to be above 1705°, at which lever $j^{12}$ is actuated, and below which the furnace thermocouple I ordinarily will not fall during the soaking operation. It is theoretically possible to operate without use of the ignition means X after the furnace attains a temperature of 1300° or 1400° F. The saving obtainable by cutting the ignition means out of service during the relatively short final portion of the heating up operation in which the furnace temperature is rising from the temperature last mentioned to its approximately final temperature is offset, in the arrangement illustrated, by the desirable simplicity in the manner in which the switch LB is actuated.

In my co-pending application Ser. No. 201,069, filed April 9, 1938, I am disclosing a control apparatus like that herein, in that it comprises a "proportioning" control bridge circuit, adapted to be unbalanced by adjustments separately effected in response to variations in each of two controlling conditions, and in said application, I am claiming novel subject matter disclosed in common in said application and herein, and not claimed herein.

In referring herein, and in the appended claims, to the adjustment of the contacts M, N, and P, the adjustment of those contacts relative to their respective resistors $m$, $n$, and $p$, is contemplated, and such adjustment may be effected by moving the resistors while the contacts engaging them are held stationary, as is done in some commercial potentiometer instruments, as well as by moving the contacts while holding the resistors stationary as is done in other commercial potentiometer instruments.

While in accordance with the provisions of the statutes, I have illustrated and described the best form of embodiment of the invention now known to me, it will be apparent to those skilled in the art that changes may be made in the form of the apparatus disclosed without departing from the spirit of the invention as set forth in the appended claims and that in some cases certain features of my invention may be used to advantage without a corresponding use of other features.

Having now described my invention, what I claim as new and desire to secure by Letters Patent, is:

1. In controlling the supply of heat to a heater by and in accordance with measurements of the temperature of the heater and of work heated therein, the method which consists in regulating the heat supply to the heater in sole response to the heater temperature while the work temperature is below a predetermined value, and in regulating the heat supply in sole response to the work temperature after the latter has attained said value and so long as the heater temperature does not exceed a second predetermined value, and in regulating the heat supply in joint response to the temperatures of the work and heater after the heater temperature attains said second value.

2. In controlling the supply of heat to a heater by and in accordance with measurements of the temperature of the heater and of work heated therein, the method which consists in regulating the heat supply to the heater in sole response to the heater temperature while the work temperature is below a predetermined value, and in regulating the heat supply in sole response to the work temperature after the latter has attained said value and so long as the heater temperature does not exceed a second predetermined value, and in regulating the heat supply in joint response to the temperatures of the work and heater after the heater temperature attains said second value and until the furnace temperature attains a third predetermined value higher than said second value, and then regulating the supply of heat in sole response to the heater temperature and so as to minimize the latter.

3. In a temperature control system, a device responsive to a work temperature, a device responsive to a heater temperature, measuring means cooperating with said devices to separately measure the work and heater temperatures, a heat supply regulator and controlling means for said regulator including devices selectively responsive to the temperatures measured for adjusting said regulator in sole response to the work temperature under one temperature condition, and in sole response to the heater temperature under a second temperature condition, said temperature conditions resulting in and being indicated by the attainment of predetermined values of the temperatures measured.

4. In a temperature control system, a device responsive to a work temperature, a device responsive to a heater temperature, measuring means, means cooperating with said measuring means and devices to separately measure the work and heater temperatures, a heat supply regulator and controlling means for said regulator including devices selectively responsive to the temperatures measured for adjusting said regulator in sole response to the work temperature under one temperature condition, and in sole response to the heater temperature under a second temperature condition, and in joint response to the work and heater temperatures under a third temperature condition, said temperature conditions resulting in and being indicated by the attainment of predetermined values of the temperatures measured.

5. The combination with a batch heater in which work and furnace temperatures are much lower in an initial portion than in a later portion of a batch heating operation and regulating means adjustable to vary the supply of heat to the heater in accordance with the extent of adjustment of said means, of means for separately measuring a temperature of said heater and a temperature of work heated by the heater, and, control means manually adjustable into either of two operative conditions, in one of which said measuring means is adapted to adjust said regulating means in accordance with the resultant of variations in said temperatures, and in the other of which said measuring means is adapted to adjust said regulating means solely in response to variations in one only of those temperatures.

6. The combination with a batch heater in which work and furnace temperatures are much lower in an initial portion than in a later portion of a batch heating operation and regulating means adjustable to vary the supply of heat to the heater in accordance with the extent of adjustment of said means, of means for separately measuring a temperature of said heater and a temperature of work heated by the heater, control means controlled by said measuring means and through which the latter is normally operative to adjust said regulating means in accordance with the resultant of variations in said temperatures, and manual means for adjusting said control means to make the adjustment of said regulating means by said measuring means solely dependent upon the temperature of said heater.

7. In a temperature control system, an element deflecting in accordance with a heater temperature, a second element deflecting in accordance with the temperature of work heated by said heater, a heat supply regulator, and controlling means therefor comprising a bridge circuit including a resistor, a first contact adjusted along the resistor in accordance with the deflection of the first mentioned element, a second resistor, a second contact adjusted along said second resistor in accordance with the deflection of said second element, a third resistor, a third contact adjustable along said third resistor, contact connecting means adjustable to connect said third contact to either or both of the first mentioned contacts, means responsive to unbalance in said circuit for adjusting said third contact along said third resistor to rebalance said circuit when unbalanced by the adjustment of both or either of the first and second contacts then connected to the third contact and for correspondingly adjusting said heat regulator, and means actuating said connecting means in accordance with the deflection of said elements to connect said third contact to said first contact when the work temperature is below a predetermined value, and to connect said third contact to said second contact when the work temperature attains said predetermined value and the heater temperature is below a second value, and to connect said third contact to the first and second contacts when the heater temperature next attains said second value, and to disconnect the third and first contacts when the heater temperature attains a predetermined value higher than said second value.

8. The combination with a furnace heated by the combustion of gaseous fuel, of means for regulating the supply of fuel to the furnace in accordance with temperature conditions therein comprising a control element actuated on the attainment of a particular furnace working temperature less than the maximum regulated furnace temperature, to vary the fuel supply rate, and electrical fuel ignition means energized for continuous operation while the furnace is being brought up to working temperatures and de-energized by the actuation of said element.

9. The combination of a control bridge circuit including first, second and third resistors, and first, second and third contacts, respectively engaging said resistors and each adapted to be adjusted along the resistor which it engages, means for measuring one quantity and adjusting said first contact in accordance with the measurement, means for measuring a second quantity and adjusting said second contact in accordance with the last mentioned measurement, an adjustable regulator adapted on its adjustment to effect a control action and to adjust said third contact, contact connecting means collectively controlled by the first and second mentioned means to connect said third contact alternatively to the first contact, to the second contact, and to both the first and second contacts on the attainment of predetermined values by said quantities, means responsive to a potential change in said circuit produced by the adjustment of the first or second contact when connected to said third contact for adjusting said regulator to neutralize said change by its adjustment of said third contact.

10. The combination of a control bridge circuit including first, second and third resistors, and first, second and third contacts respectively engaging said resistors and each adapted to be adjusted along the resistor which it engages, means for measuring one quantity and adjusting said first contact in accordance with the measurement, means for measuring a second quantity and adjusting said second contact in accordance with the last mentioned measurement, an adjustable regulator adapted on its adjustment to effect a control action and to adjust said third contact, a contact connecting means adjusted by the first mentioned means to connect said third and first contacts on the attainment of a predetermined value by said one quantity, and adjusted by the second mentioned means to connect said third and second contacts on the attainment of a predetermined value by said second quantity, and means responsive to a potential change in said circuit produced by the adjustment of the first or second contact when connected to said third contact for adjusting said regulator to neutralize said change by its adjustment of said third contact.

11. The combination of a control bridge circuit including first, second and third resistors, and first, second and third contacts respectively engaging said resistors and each adapted to be adjusted along the resistor which it engages, means responsive to one controlling condition for adjusting said first contact, means responsive to a second controlling condition for adjusting said second contact, an adjustable regulator adapted on its adjustment to effect a control action and to adjust said third contact, contact connecting means adjustable to connect said third contact to one or to the other of the first and second contacts, means controlled by the first and second mentioned means for adjusting said connecting means in accordance with predetermined variations in controlling condition values, and means responsive to a potential change in said circuit produced by the adjustment of the first or second contact, when connected to said third contact, for adjusting said regulator to neutralize said change by its adjustment of said third contact.

12. The combination of a control bridge circuit including first, second and third resistors, and first, second and third contacts respectively engaging said resistors and each adapted to be adjusted along the resistor which it engages, means for measuring one quantity and adjusting said first contact in accordance with the measurement, means for measuring a second quantity and adjusting said second contact in accordance with the last mentioned measurement, an adjustable regulator adapted on its adjustment to effect a control action and to adjust said third contact, contact connecting means adjusted by the first mentioned means to connect said third and first contacts on the attainment of a predetermined value by said one quantity, and adjusted by the second mentioned means to connect said third and second contacts on the attainment of a predetermined value by said second quantity, and adjusted by the first mentioned means to connect said third and first contacts on the attainment by said one quantity of a predetermined value higher than the first mentioned value, and means responsive to a potential change in said circuit produced by the adjustment of the first or second contact when connected to said third contact for adjusting said regulator to neutralize said change by its adjustment of said third contact.

13. The combination of a control bridge circuit including first, second and third resistors, and first, second and third contacts, respectively engaging said resistors and each adapted to be adjusted along the resistor which it engages, means responsive to one controlling condition for adjusting said first contact, means responsive to a second controlling condition for adjusting said second contact, an adjustable regulator adapted on its adjustment to effect a control action and to adjust said third contact, contact connecting means adjustable to connect said third contact to one or to the other or to both of the first and second contacts, means controlled by the first and second mentioned means for adjusting said connecting means in accordance with predetermined variations in controlling condition values, and means responsive to a potential change in said circuit produced by the adjustment of the first or second contact, when connected to said third contact, for adjusting said regulator to neutralize said change by its adjustment of said third contact.

14. The combination with a batch heater in which work and furnace temperatures are much lower in an initial portion than in a later portion of a batch firing operation, of a device responsive to a heater temperature, a device responsive to a temperature of work heated by said heater, a regulator adapted to vary the supply of heat to the heater in accordance with the extent of adjustment of said regulator, and regulator controlling means comprising a bridge circuit including a circuit adjusting element actuated by the first mentioned device to unbalance said circuit in one direction or the other on an increase or a decrease, respectively, in the heater temperature, a second adjusting element actuated by said second mentioned device to unbalance said circuit in said one or in said other direction on an increase or a decrease, respectively, in the work temperature, and a third circuit adjusting element, and means actuated in response to unbalance in said circuit in said one or in said other direction to adjust said third element to rebalance the circuit and to correspondingly adjust said regulator and thereby respectively decrease or increase the supply of heat to the heater.

15. The combination with a batch heater in which work and furnace temperatures are much lower in an initial portion than in a later portion of a batch heating operation, of regulating means adapted to vary the supply of heat to the heater in accordance with the extent of adjustment of said means, and controlling means for said regulating means comprising a bridge circuit including first and second adjustable elements, each adapted by its adjustment to unbalance said circuit in a direction dependent on the direction of said adjustment, and a third element adapted by its adjustment in one direction or the other to rebalance said circuit, means for adjusting said first element in one direction or the other on an increase or decrease, respectively, in the heater temperature, means for adjusting said second element in said one or said other direction on an increase or decrease, respectively in the temperature of work heated by the heater, and means responsive to unbalance in said circuit to adjust said third element to rebalance said circuit and to correspondingly adjust said regulating means and thereby respectively decrease or increase the supply of heat to the heater.

ANKER E. KROGH.